United States Patent
Watanabe

(10) Patent No.: US 8,833,838 B2
(45) Date of Patent: Sep. 16, 2014

(54) VEHICLE BODY FRONT STRUCTURE

(71) Applicant: Honda Motor Co., Ltd, Tokyo (JP)

(72) Inventor: Yasunori Watanabe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/903,134

(22) Filed: May 28, 2013

(65) Prior Publication Data

US 2013/0320710 A1    Dec. 5, 2013

(30) Foreign Application Priority Data

May 30, 2012 (JP) .................................. 2012-122684

(51) Int. Cl.
*B62D 25/08* (2006.01)
*B62D 21/15* (2006.01)
*B60R 19/34* (2006.01)

(52) U.S. Cl.
CPC .............. *B62D 25/08* (2013.01); *B60R 19/34* (2013.01); *B62D 25/082* (2013.01); *B62D 21/152* (2013.01)
USPC ................................. 296/187.09; 296/203.02

(58) Field of Classification Search
CPC .............................. B62D 25/08; B62D 21/152
USPC ........................... 296/187.09, 193.09, 203.02
See application file for complete search history.

(56) References Cited

U.S. PATENT DOCUMENTS

| 7,213,873 B2* | 5/2007 | Murata et al. ................. 296/204 |
| 8,393,673 B2* | 3/2013 | Terada et al. ............ 296/193.09 |
| 2011/0095568 A1* | 4/2011 | Terada et al. ............ 296/187.09 |
| 2012/0187719 A1* | 7/2012 | Fujii et al. ................ 296/187.09 |

FOREIGN PATENT DOCUMENTS

JP    2000-53022 A    2/2000

* cited by examiner

*Primary Examiner* — Lori Lyjak
(74) *Attorney, Agent, or Firm* — Westerman, Hattori, Daniels & Adrian, LLP

(57) ABSTRACT

A vehicle body front structure includes a pair of left and right front side frames which are installed at a front of a vehicle body, and extend in a fore-and-aft direction of the vehicle body; and a power unit disposed in a driving force transmission chamber between the left and right front side frames. The left and right front side frames include respective branch frames which extend from the left and right front side frames obliquely forward and outward in a vehicle width direction, rear ends of the branch frames penetrate through respective outer walls of the left and right front side frames, and extend along inner surfaces of the left and right front side frames, and a reinforcing member is integrally connected to each of intersection portions of the branch frames and the front side frames.

11 Claims, 14 Drawing Sheets

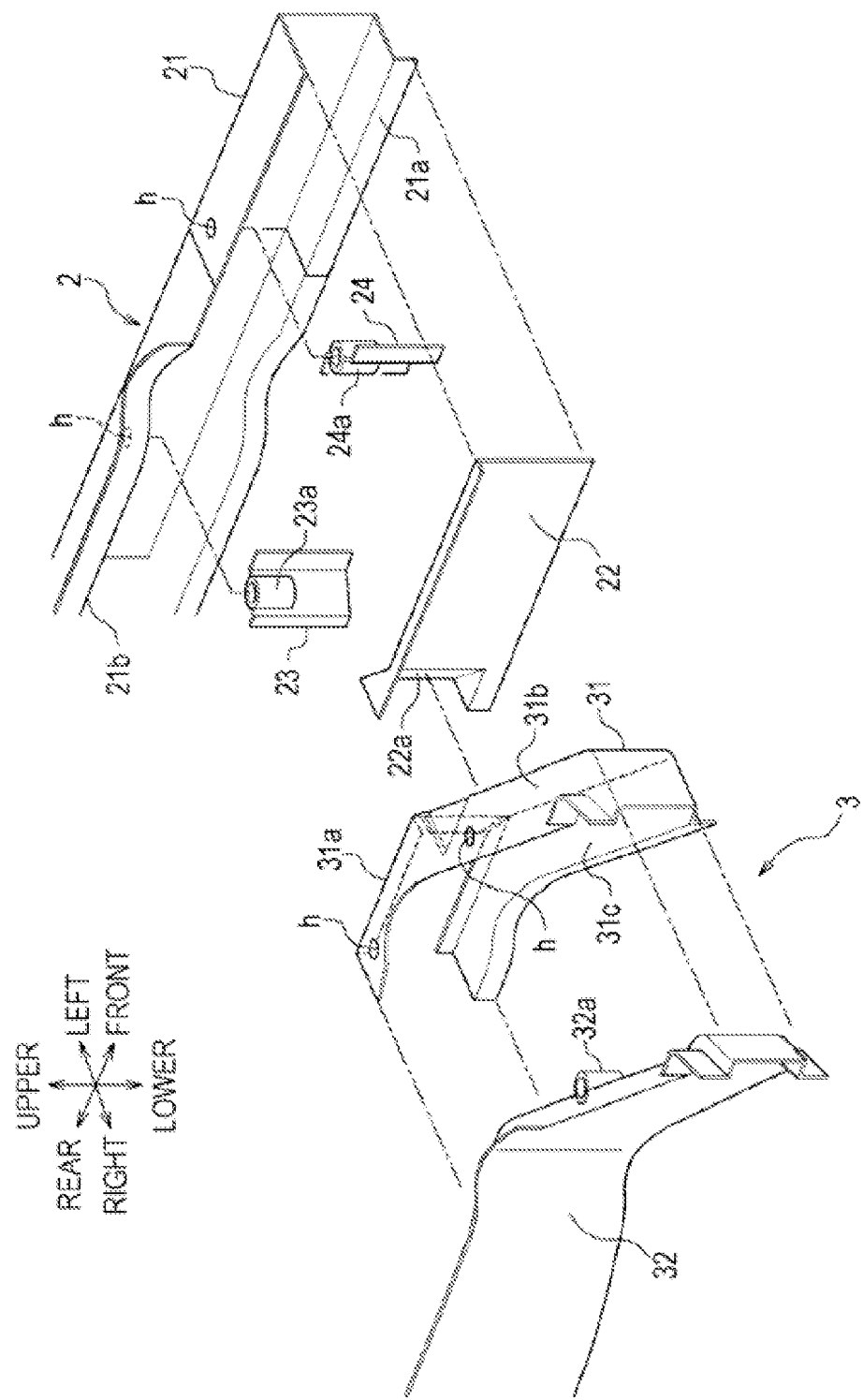

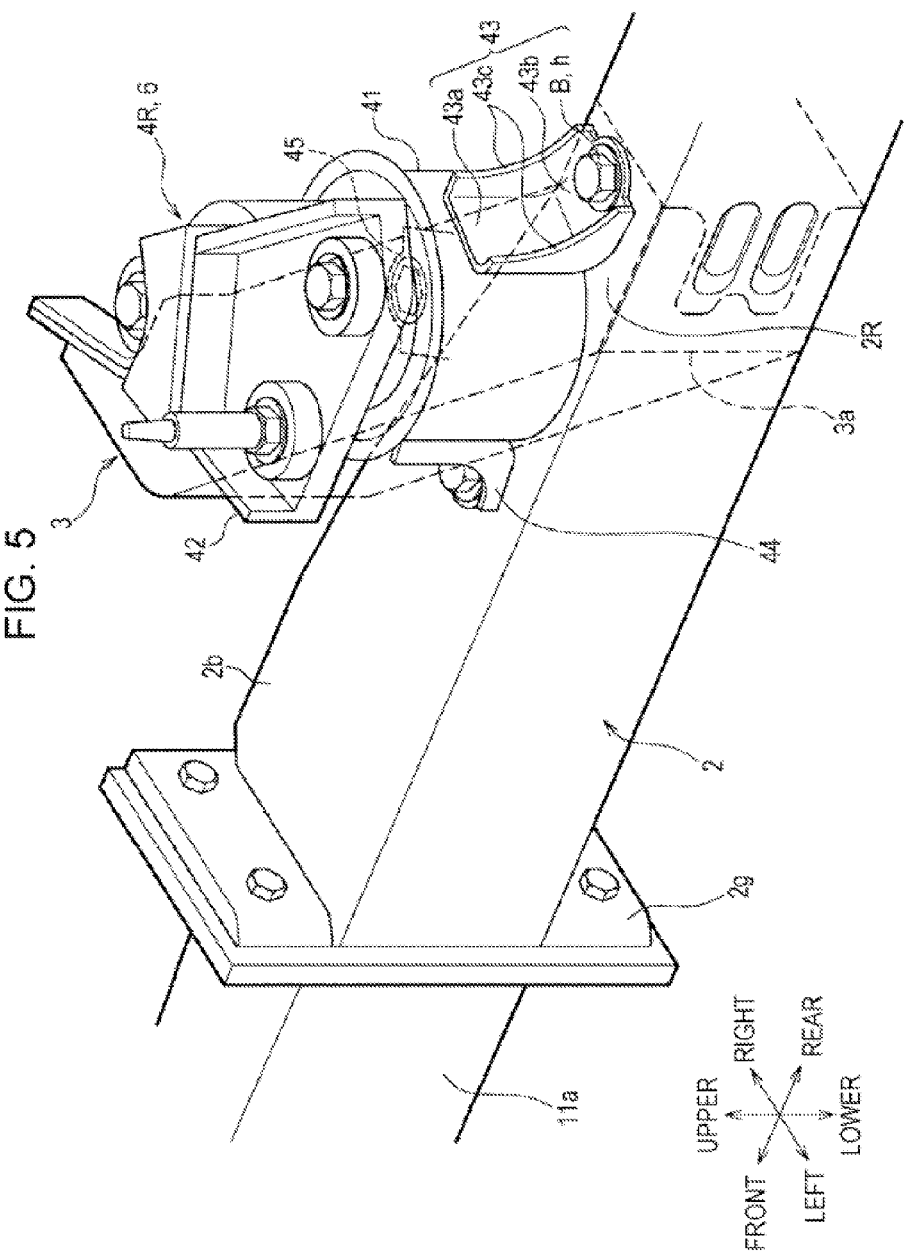

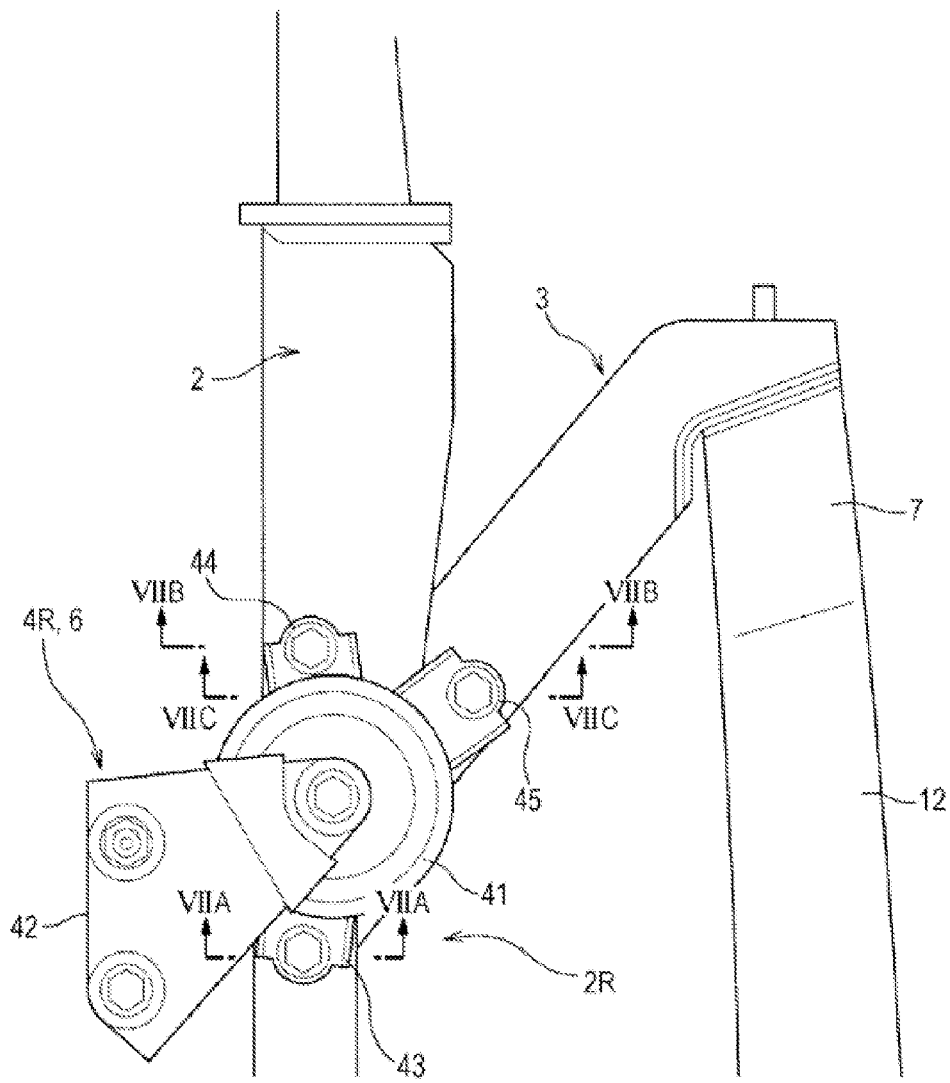

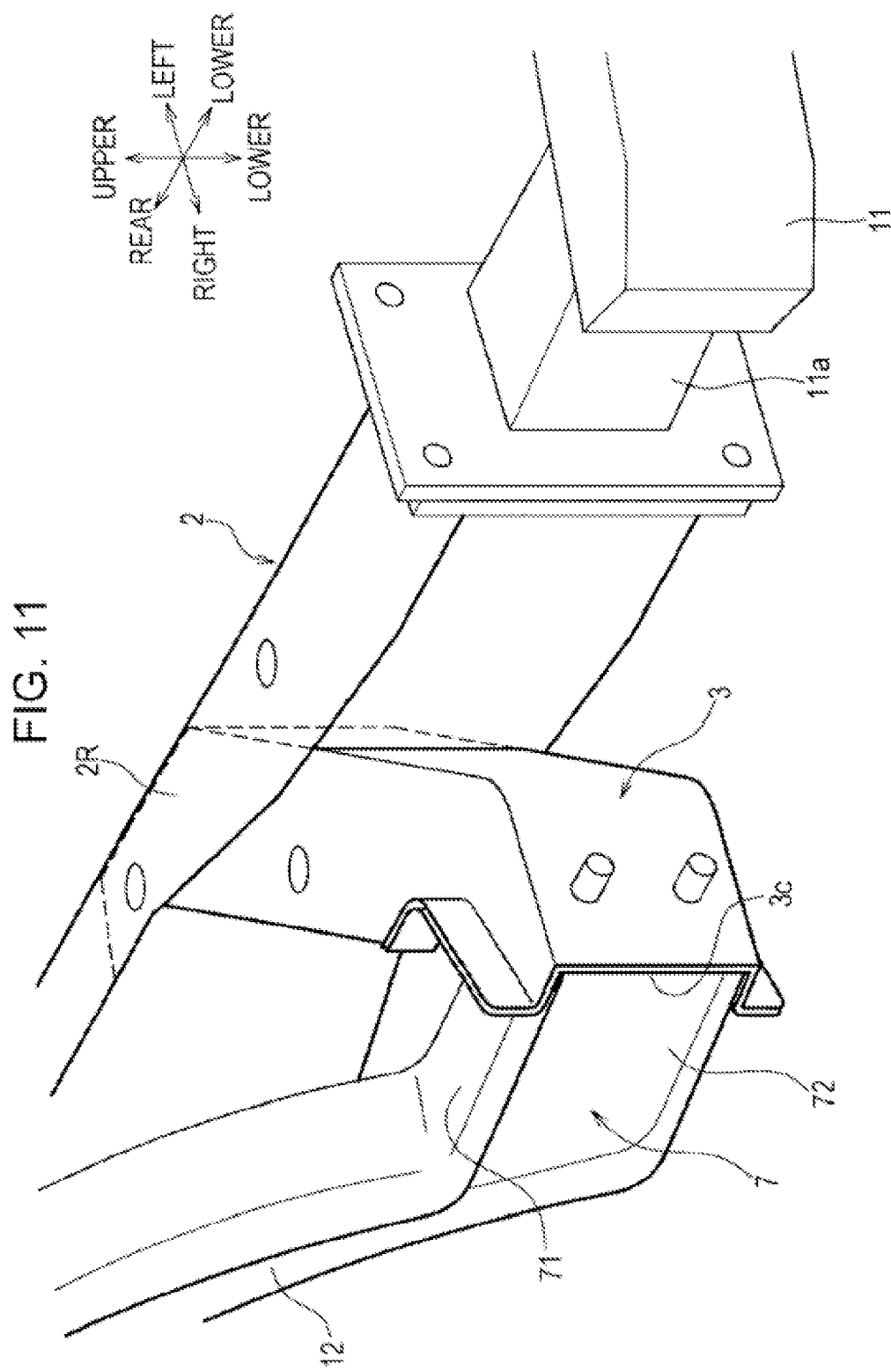

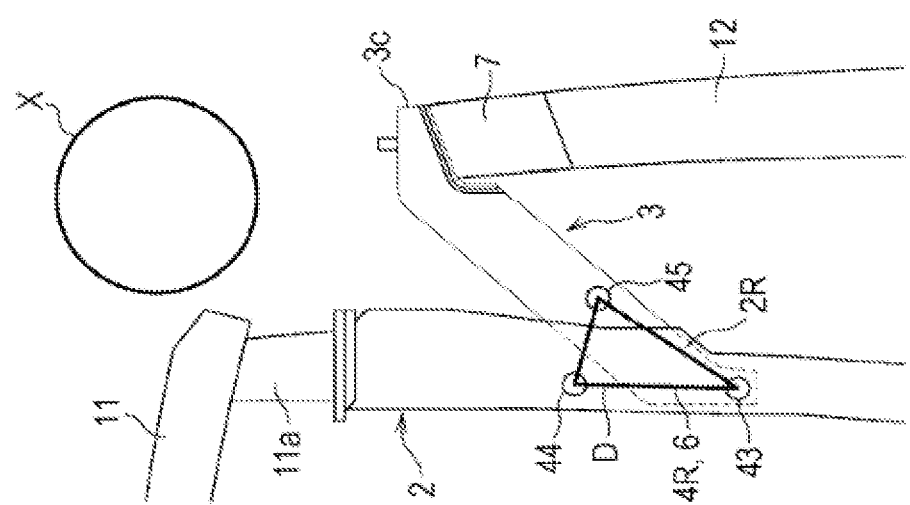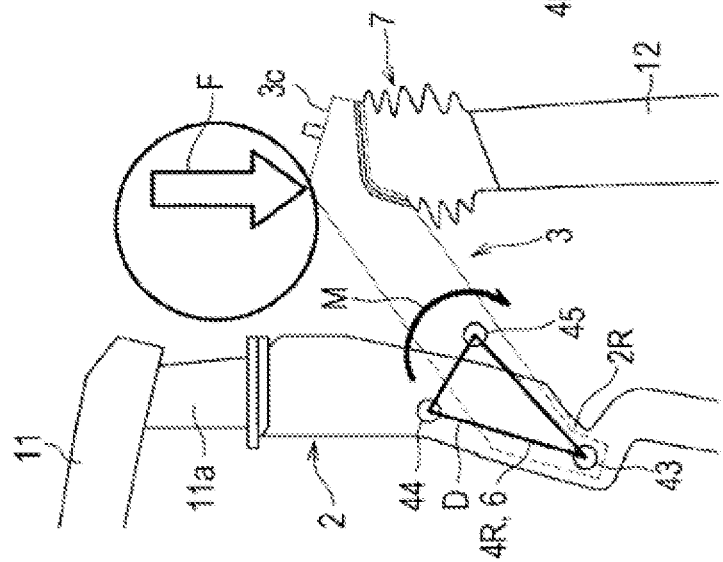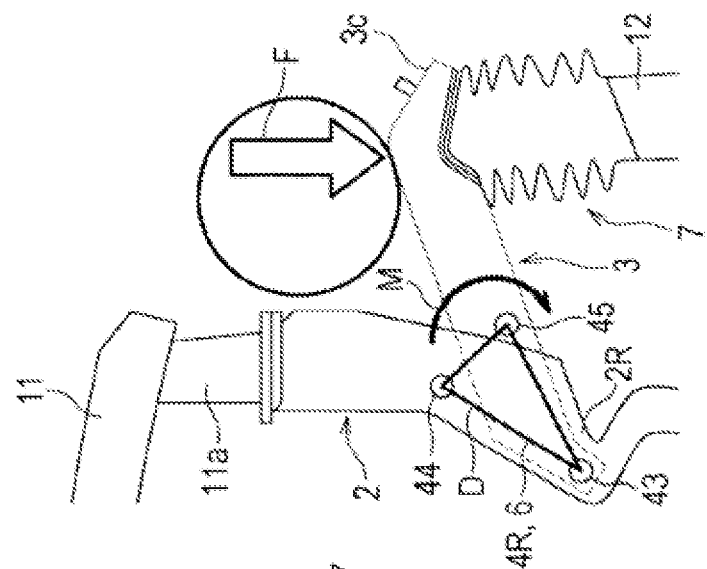

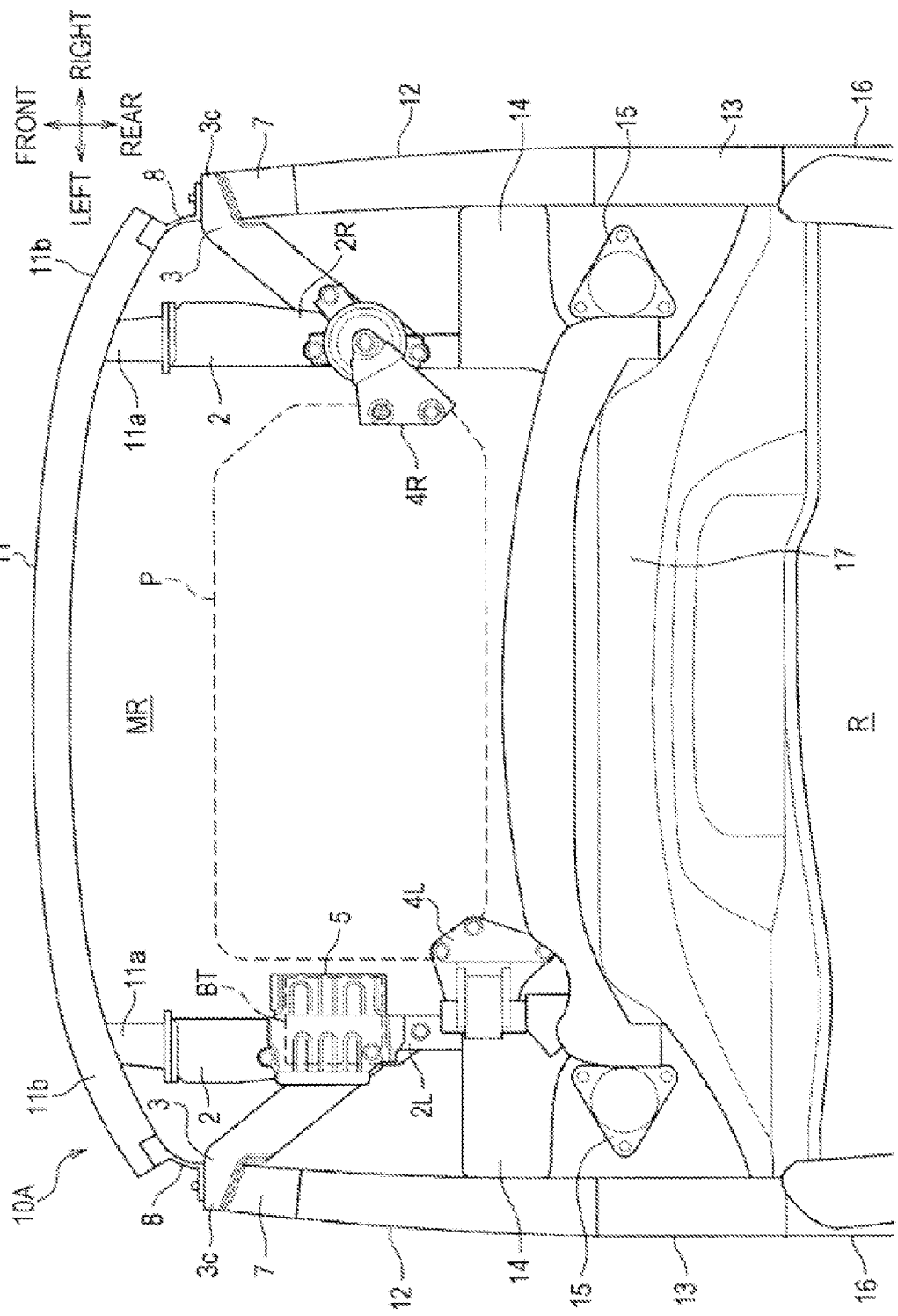

VEHICLE BODY FRONT STRUCTURE

CROSS REFERENCES TO RELATED APPLICATIONS

The present application claims priority under 35 U.S.C. §119 to Japanese Patent Application No. 2012-122684, filed May 30, 2012, entitled "Vehicle Body Front Structure." The contents of this application are incorporated herein by reference in their entirety.

TECHNICAL FIELD

The present disclosure relates to a vehicle body front structure.

BACKGROUND

Up to the present, a technology has been developed which prevents backward movement of the front portion of a vehicle toward the cabin of the vehicle in a collision with an object, by absorbing the impact of the collision through deformation of the front side frame disposed on both sides of the engine compartment.

For example, Japanese Unexamined Patent Application Publication No. 2000-053022 (claim 2 and FIG. 2) discloses a technology in which the lateral sides of a front side frame are each provided with a branch frame (frame in an inclined position) which extends from the middle portion of the lateral side obliquely forward with respect to the vehicle, so that even when a collision with an object occurs, for example, in a narrow space outside the front side frame, i.e., even when a narrow offset collision occurs, the collision load is transmitted to the middle portion of the front side frame via the branch frame and thus the front side frame is deformed.

SUMMARY

However, with the structure described in Japanese Unexamined Patent Application Publication No. 2000-053022, the connecting portion between the front side frame and the branch frame may be accidentally disconnected when a narrow offset collision occurs. In this case, only the branch frame is deformed and the collision load is not transmitted to the front side frame, and thus the deformation effect of the front side frame decreases.

The present disclosure has been made in view of the above-described problem, and provides a vehicle body front structure which reinforces the connecting portion between the front side frame and the branch frame.

An aspect of the present disclosure provides a vehicle body front structure including: a pair of left and right front side frames which are installed at a front of a vehicle body, and extend in a longitudinal direction of the vehicle body; and a power unit disposed in a driving force transmission chamber between the left and right front side frames. The left and right front side frames include respective branch frames which extend from portions of the left and right front side frames located on lateral sides of the power unit, obliquely forward and outward in a vehicle width direction, rear ends of the branch frames penetrate through respective outer walls of the left and right front side frames, and extend along inner surfaces of the left and right front side frames, and a reinforcing member is integrally connected to each of intersection portions of the branch frames and the front side frames.

With this structure, the branch frame, the front side frame, and the reinforcing member are moved together (as a unit), and thus the front side frame and the branch frame can be bent while generating a reaction force (load) without the branch frame being disconnected from the front side frame. Therefore, the energy of a so-called narrow offset collision can be absorbed.

Preferably, the reinforcing member is a supporting member which supports a device disposed in the driving force transmission chamber.

As described above, the reinforcing member is formed by a supporting member which supports the device disposed in the driving force transmission chamber, and thus an additional reinforcing member is not necessary because the supporting member is utilized as the reinforcing member, and an increase in the number of components and the weight of the vehicle can be reduced. In addition, the supporting member and the reinforcing member can be secured simultaneously, and thus an increase in manufacturing steps can be reduced.

Preferably, the reinforcing member is an engine mounting member, and the engine mounting member includes a intersection portion bolt connection portion which is connected to corresponding one of intersection portions of the front side frames and the branch frames; a main frame bolt connection portion connected to corresponding one of the front side frames; and a branch frame bolt connection portion connected to corresponding one of the branch frames, and the three bolt connection portions form three vertices of a triangle shape.

As described above, the reinforcing member is formed by the engine mounting member, and thus the engine mounting member and the reinforcing member can be secured simultaneously, and therefore, an increase in the number of components can be reduced. Furthermore, complicated manufacturing process can be prevented, and an increase in the weight of the vehicle can be reduced. As described above, the engine mounting member includes a intersection portion bolt connection portion which is connected to corresponding one of intersection portions of the front side frames and the branch frames; a main frame bolt connection portion connected to corresponding one of the front side frames; and a branch frame bolt connection portion connected to corresponding one of the branch frames, and the three bolt connection portions form three vertices of a triangle shape, and thus the securing position of the engine mounting member can be optimally arranged, and a vibration control effect can be increased by stably supporting the engine mounting member. In addition, the front side frame and the branch frame can be connected firmly because the metal base used for securing the engine mounting member has higher strength, and thus disconnection of the branch frame from the front side frame can be reliably prevented.

Preferably, the reinforcing member is a battery base, and the battery base includes a intersection portion bolt connection portion which is connected to the front side frames and the branch frames; and a main frame bolt connection portion connected to corresponding one of the front side frames.

As described above, the reinforcing member is a battery base, and the battery base includes a intersection portion bolt connection portion which is connected to the front side frames and the branch frames; and a main frame bolt connection portion connected to corresponding one of the front side frames, and thus the battery base and the reinforcing member can be secured simultaneously, and therefore, an increase in the number of components can be reduced. Furthermore, complicated manufacturing process can be prevented, and an increase in the weight of the vehicle can be reduced.

Preferably, the intersection portion bolt connection portions are spaced apart from connecting portions between inner surfaces of inner walls of the front side frames and the branch frames.

As described above, the intersection portion bolt connection portions are spaced apart from connecting portions between inner surfaces of inner walls of the front side frames and the branch frames, and thus cross sectional stiffness of the connecting portion between the front side frame and the branch frame can be increased, and the front side frame and the branch frame can be bent upon a narrow offset collision while generating a reaction force (load) without the branch frame being disconnected from the front side frame.

Preferably, the main frame bolt connection portion and the intersection portion bolt connection portion are secured via a bolt to nuts which are disposed in bulkheads in the front side frames.

As described above, the main frame bolt connection portion and the intersection portion bolt connection portion are secured via a bolt to nuts which are disposed in bulkheads in the front side frames, and thus strength of the connection between the reinforcing member, and the front side frame and the branch frame can be improved, and the front side frame and the branch frame can be bent while generating a reaction force (load) without the branch frame being disconnected from the front side frame.

Preferably, the vehicle body front structure further includes a pair of left and right lower members on the outer side of the front side frames, which extend in the longitudinal direction, and ends of the branch frames are connected to respective box-shaped impact absorbing members which extend forwardly from ends of the lower members.

As described above, the vehicle body front structure further includes a pair of left and right lower members which extend in the longitudinal direction, and are located on the outer side of the front side frames, and ends of the branch frames are connected to respective box-shaped impact absorbing members which extend forwardly from ends of the lower members, and thus when the branch frame is pushed backward and deformed in a narrow offset collision, the impact absorbing member is crushed between an object and the front wheel, and the energy of the collision can be absorbed.

Preferably, the vehicle body front structure further includes a bumper beam installed at front ends of the left and right front side frames, and the branch frames are connected to left and right ends of the bumper beam by respective connecting members.

As described above, the vehicle body front structure further includes a bumper beam installed at front ends of the left and right front side frames, and the branch frames are connected to left and right ends of the bumper beam by respective connecting members, and thus in a light collision, the bumper beam and the connecting member are deformed to absorb the impact of the collision, and deformation of a vehicle body frame such as the branch frame, the lower member, or the front side frame can be prevented. Therefore, repair cost is reduced, and the bumper beam and the connecting member are deformed to absorb the impact.

BRIEF DESCRIPTION OF THE DRAWINGS

The advantages of the disclosure will become apparent in the following description taken in conjunction with the following drawings.

FIG. 4 is an exploded perspective view of FIG. 3.

FIG. 5 is a perspective view of an engine mounting member installed at the right-side intersection portion.

FIG. 6 is a plan view of the right-side intersection portion and the engine mounting member.

FIG. 7A is a cross-sectional view taken along a line VIIA-VIIA in FIG. 6; FIG. 7B is a cross-sectional view taken along a line VIIB-VIIB in FIG. 6; and FIG. 7C is a cross-sectional view taken along a line VIIC-VIIC in FIG. 6.

FIG. 10A is a cross-sectional view taken along a line XA-XA in FIG. 9; and FIG. 10B is a cross-sectional view taken along a line XB-XB in FIG. 9.

FIG. 11 is a perspective view of the vicinity of the end of the right-side branch frame.

FIGS. 12A, 12B and 12C are schematic views illustrating the movement of the branch frame when a narrow offset collision occurs. FIG. 12A is a schematic view before the collision; FIG. 12B is a schematic view at an initial stage of the collision; and FIG. 12C is a schematic view at a later stage of the collision.

FIG. 13 is a plan view of a vehicle body front structure according to a second embodiment.

DETAILED DESCRIPTION

A first embodiment of the present disclosure will be described in detail with reference to FIGS. 1 to 12C. In the description, the same components are labeled with the same reference symbols and redundant description is omitted. When a direction is referred, description is given based on the front, rear, left right, upper and lower when viewed from the driver of a vehicle. It is to be noted that the vehicle width direction is synonymous with the left and right direction.

Figure 1:
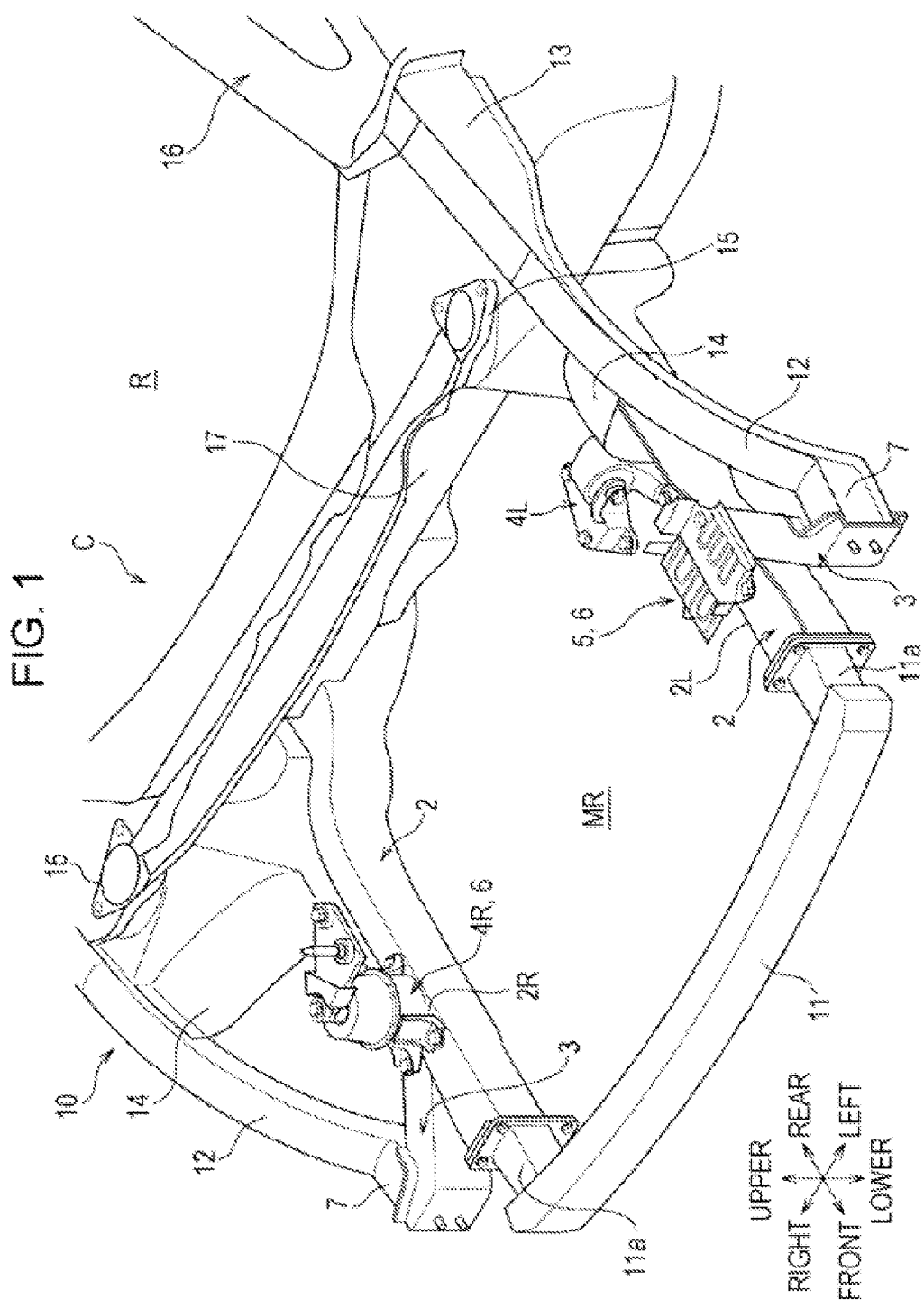
FIG. 1 is a perspective view of a vehicle body front structure according to a first embodiment.
Figure 2:
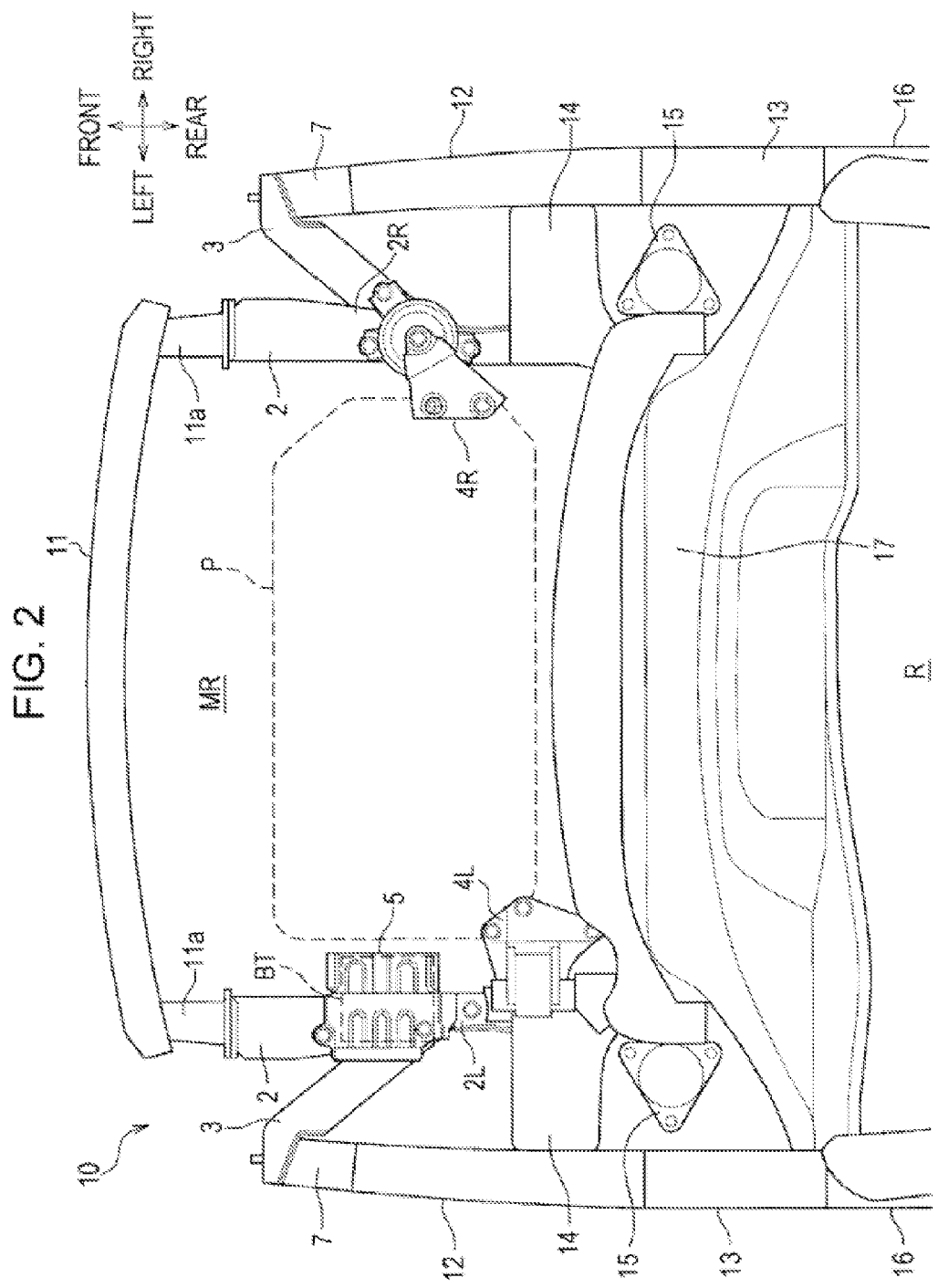
FIG. 2 is a plan view of the vehicle body front structure.

FIG. 1 is a perspective view of the vehicle body front structure according to the first embodiment. FIG. 2 is a plan view of the vehicle body front structure. As illustrated in FIGS. and 2, a vehicle C having a vehicle body front structure 10 according to the first embodiment is an automobile which has a driving force mount chamber MR at the front portion of the vehicle, for example, an automobile such as FF (front engine and front drive), FR (front engine and rear drive), or a four-wheel drive vehicle. The form or type of the vehicle C is not particularly limited as long as the vehicle C has the driving force mount chamber MR in which a power unit P such as an engine or an electric motor, and a device such as a battery BT (see FIG. 2) are installed.

The vehicle body front structure 10 forms the front part of the vehicle C, and mainly includes a pair of left and right front side frames 2 which are disposed to extend in the longitudinal direction of the vehicle at the side of the driving force mount chamber MR; a bumper beam 11 which is installed at front end of the pair of front side frames 2; lower members 12 which are disposed to extend in the longitudinal direction outside the front side frames 2 with respect to the vehicle; upper members 13 extending rearward from the respective rear ends of the lower members 12; front wheel houses 14 which respectively cover between the front side frames 2 and the lower members 12; a pair of damper bases 15 disposed inside the vehicle with respect to the upper members 13; a pair of front pillars 16 connected to the respective rear ends of the upper members 13; and a dashboard 17 which partitions between the driving force mount chamber MR and a vehicle cabin R.

The left and right front side frames 2 include a pair of left and right branch frames 3 which extend from a substantially middle portion of each front side frame 2 in the longitudinal direction to an inclined forward position outward in the vehicle width direction. In addition, a intersection portion 2R between the right-side front side frame 2 and the right-side branch frame 3 is integrally connected to an engine mounting member 4R which supports the right end of the power unit P as a supporting member, and a intersection portion 2L between the left-side front side frame 2 and the left-side branch frame 3 is integrally connected to a battery base 5 which supports the battery BT as a supporting member. The engine mounting member 4R and the battery base 5 serve as reinforcing members 6 which reinforce the intersection portions 2R and 2L, respectively. In the rear of the intersection portion 2L of the left-side front side frame 2, there is installed an engine mounting member 4L which supports the left end of the power unit P.

The bumper beam 11 is a hollow frame member which receives an impact from an object X (see FIGS. 12A, 12B and 12C) when the front of the vehicle C collides with the object X, and is composed of, for example, an aluminum extruded material. The bumper beam 11 is formed to have a slightly curved surface which projects forward at the center, and is installed at the front ends of the left and right front side frames 2. Extensions 11a, which are cylindrical steel members, are respectively disposed between the rear faces of the left and right ends of the bumper beam 11 and the front ends of the front side frames 2. The extension 11a has a function of absorbing an impact by being crushed when a collision occurs.

The lower members 12 are each a frame member which is formed to be arc-shaped so that the front end thereof is lower than the rear end. The rear ends of the lower members 12 are connected to the respective front ends of the upper members 13, and the front ends of the lower members 12 are connected to the respective ends of the branch frames 3 via respective box members 7 which are impact absorbing members. The front wheel (not illustrated) is disposed under each of the lower members 12.

As illustrated in FIG. 2, the power unit P includes, for example, the engine and the transmission, and is disposed between the left and right front side frames 2 in the middle thereof in the fore-and-aft direction. The power unit P is transversely installed with the support of the engine mounting members 4R, 4L disposed in the front side frames 2. The battery BT is a device which supplies power to a motor for starting the engine and electrical devices, and is installed on the battery base 5 which is disposed at the left-side intersection portion 2L.

Figure 3:
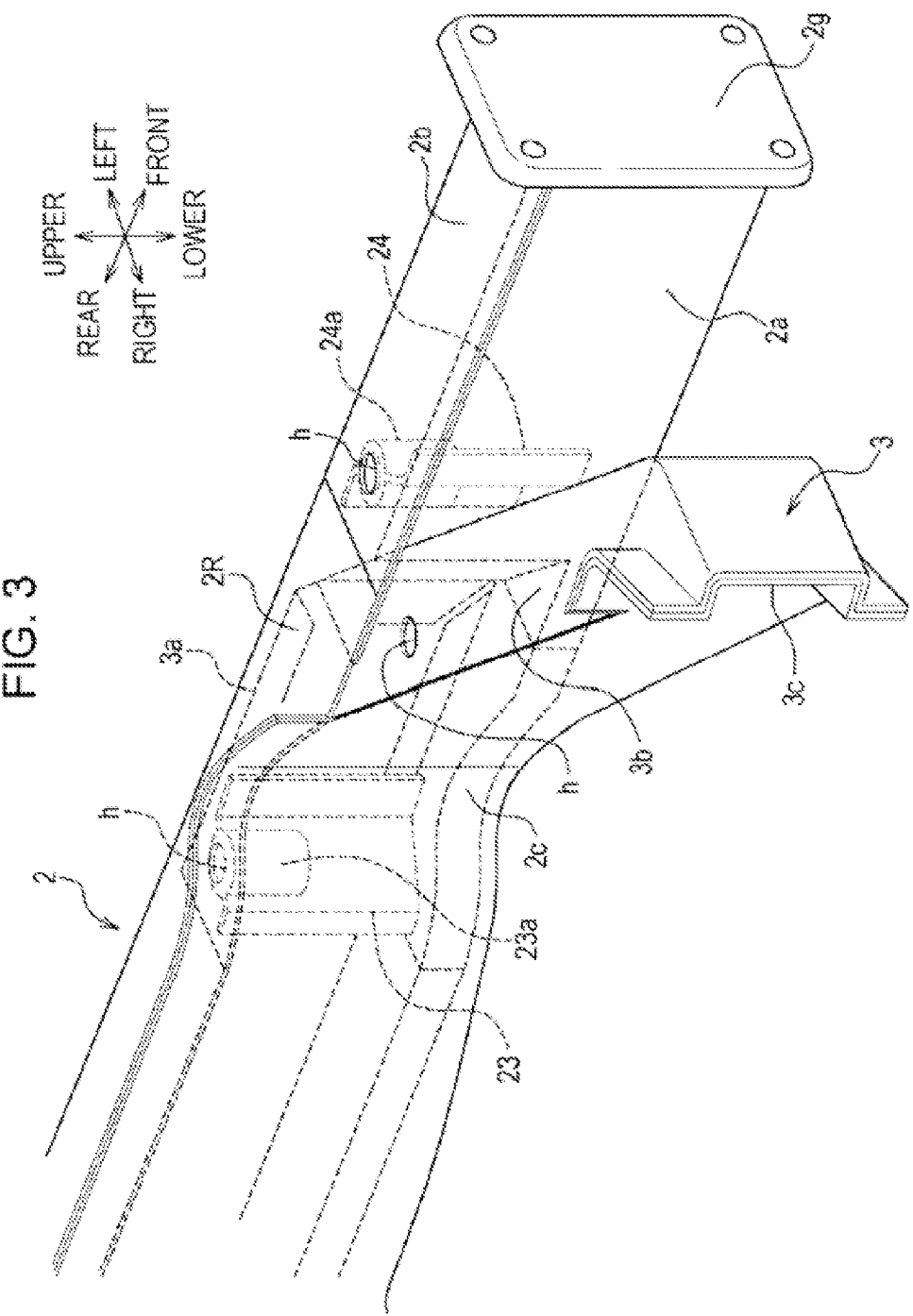
FIG. 3 is a perspective view of an intersection portion between a right-side front side frame of the vehicle and a right-side branch frame.

Next, the structure of the pair of left and right front side frames 2, and the branch frames 3 will be described in detail with reference to FIGS. 3 and 4. FIG. 3 is a perspective view of the intersection portion between the right-side front side frame of the vehicle and the right-side branch frame. FIG. 4 is an exploded perspective view of FIG. 3. Because the front side frames 2 and the branch frames 3 have a symmetrical structure, only the right-side front side frame 2 and branch frame 3 will be described, and the left-side front side frame 2 and branch frame 3 are labeled with the same reference symbols and detailed description thereof is omitted.

As illustrated in FIG. 3, the front side frame 2 is a frame member with a rectangular tubular cross-section, which is disposed to extend in the longitudinal direction. The front end of the front side frame 2 is provided with a mounting plate 2g for mounting the extension 11a. On the outer side (the right side in FIG. 3) of the front side frame 2 with respect to the vehicle, there is installed the branch frame 3 which extends obliquely forward. A base end 3a of the branch frame 3 penetrates through an outer side wall 2a of the front side frame 2, and is disposed to extend along the inner surface of the front side frame 2. The intersection portion at which the branch frame 3 intersects (penetrates into) the front side frame 2 forms the right-side intersection portion 2R. The front side frame 2 has a vulnerable portion 2c for easily bending the front side frame 2 at a position corresponding to the intersection portion 2R. The vulnerable portion 2c is a portion of the outer side wall 2a of the front side frame 2, the portion being recessed inwardly of the vehicle and having a width dimension smaller than the width dimension of the other portions.

A first bulkhead 23 is installed at a position corresponding to the intersection portion 2R of the front side frame 2 and the branch frame 3 inside the front side frame 2. A second bulkhead 24 is installed at a position spaced apart forwardly from the intersection portion 2R inside the front side frame 2. The first bulkhead 23 and the second bulkhead 24 are substantially crank-shaped plate members which are installed upright so as to diagonally partition the inside of the front side frame 2. The diagonal directions of the first and second bulkhead are opposite to each other. The upper ends of the first bulkhead 23 and the second bulkhead 24 are provided with nuts 23a, 24a for securing the bolt B (see FIG. 7). An upper wall 2b of the front side frame 2 is provided with bolt holes h, h at positions corresponding to the nuts 23a, 24a. An upper wall 3b of the branch frame 3, which extends from the outer side wall 2a of the front side frame 2, also provided with a bolt hole h.

As illustrated in FIG. 4, the front side frame 2 and the branch frame 3 mainly include the side frame body 21, the first wall 22, the first bulkhead 23, the second bulkhead 24, the branch frame body 31, and the second wall 32, and the above six members are secured to each other by, for example, flange welding.

The side frame body 21 is a channel-like member having a U-shaped cross-section, which is open outward with respect to the vehicle, and disposed to extend in the longitudinal direction of the vehicle. The first wall 22 is a plate member which covers an opening 21a of the front side frame body 21 located in front of the branch frame body 31. The first wall 22 constitutes part of the outer side wall 2a of the front side frame 2. The rear end of the first wall 22 is provided with a fitting portion 22a which is fitted to the branch frame body 31, the fitting portion 22a being recessed inwardly.

The branch frame body 31 is a channel-like member having a U-shaped cross-section, which is open outward with respect to the vehicle and has an inverted-V shape in plan view. The branch frame body 31 includes a penetrating portion 31a which penetrates into the inside of the front side frame 2, and a projecting portion 31b which projects from the front side frame 2 obliquely forward and outward with respect to the vehicle. The penetrating portion 31a is disposed to extend along the inner surface of the front side frame 2, and is integrally connected to the side frame body 21, for example, by spot welding. The upper wall of the penetrating portion 31a is provided with a bolt hole h at a position corresponding to the nut 23a of the first bulkhead 23. The side wall of the penetrating portion 31a of the branch frame body 31 is connected to the side wall of the side frame body 21 by spot welding, and thus a connecting portion is formed.

The second wall 32 is a plate member which covers an opening 31c of the branch frame body 31, and an opening 21b of the side frame body 21 located back of the branch frame body 31. The second wall 32 has a nut 32a at a position corresponding to the bolt hole h which is disposed at the projecting portion 31b of the branch frame body 31.

Figure 7A:
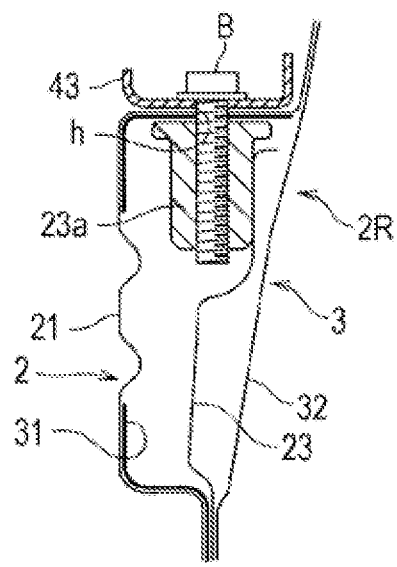
FIGS. 7A, 7B, and 7C are cross-sectional views of a bolt connection portion of the engine mounting member.
Figure 7B:
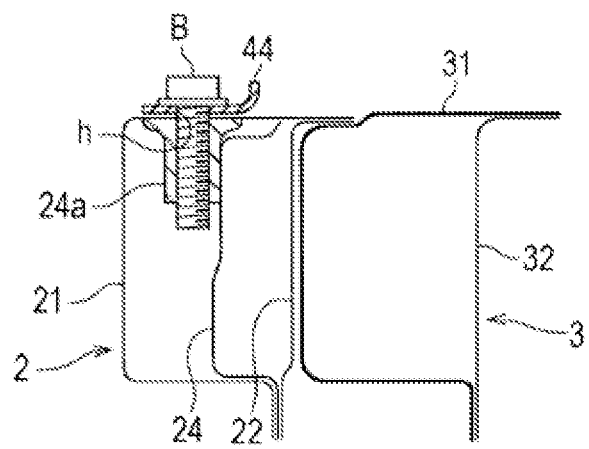
Figure 7C:
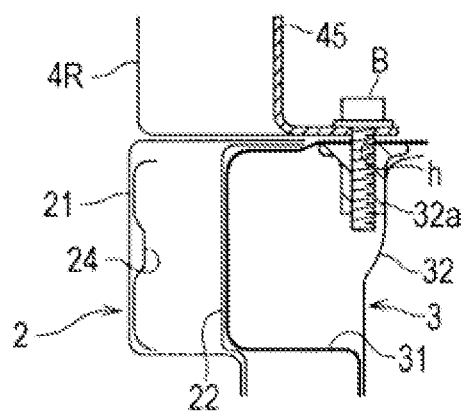

Next, the engine mounting member 4R as the reinforcing member 6 will be described with reference to FIGS. 5 to 7. FIG. 5 is a perspective view of the engine mounting member installed at the right-side intersection portion. FIG. 6 is a plan view of the right-side intersection portion and the engine mounting member. FIGS. 7A, 7B, and 7C are cross-sectional views of a bolt connection portion of the engine mounting member. FIG. 7A is a cross-sectional view taken along a line VIIA-VIIA in FIG. 6; FIG. 7B is a cross-sectional view taken along a line VIIB-VIIB in FIG. 6; and FIG. 7C is a cross-sectional view taken along a line VIIC-VIIC in FIG. 6.

As illustrated in FIG. 5, the engine mounting member 4R is a device which reduces transmission of vibration to the vehicle body by suspendedly supporting the power unit P (see FIG. 2), and is installed on the upper surface of the right-side intersection portion 2R. The engine mounting member 4R is made of special steel material which has a strength higher than a high-tensile steel plate included in the front side frame 2 and the branch frame 3, for example. The engine mounting member 4R has a cylindrical main body 41 in which an elastic member is incorporated, a bracket 42 installed on the upper portion of the main body 41, and three bolt connection portions 43, 44, 45 which are disposed around the circumference of the main body 41. The three bolt connection portions 43, 44, 45 are arranged so as to form three vertices of a triangle shape in a plan view (that is to say, three bolt connection portions 43, 44, 45 are not colinear) (see FIG. 6).

As illustrated in FIG. 5, the bolt connection portion 43 includes a vertical wall 43a which is fixed to the outer circumferential surface of the main body 41, a horizontal wall 43b which extends from the lower end of the vertical wall 43a, and a pair of ribs 43c which connect both edges of the vertical wall 43a and the horizontal wall 43b. The end of the horizontal wall 43b is provided with a bolt hole h for inserting the bolt B therein. Other two bolt connection portions 44, 45 has the same structure as that of the bolt connection portion 43 except for position, and thus detailed description is omitted. In the following description, the three bolt connection portions 43, 44, 45 are referred to as the intersection portion bolt connection portion 43, the main frame bolt connection portion 44, and the branch frame bolt connection portion 45, respectively.

As illustrated in FIGS. 5 to 7, the intersection portion bolt connection portion 43 is connected to the intersection portion 2R of front side frame 2 and the branch frame 3. More specifically, as illustrated in FIG. 7A, the intersection portion bolt connection portion 43 is disposed at a superimposed portion of the upper wall of the side frame body 21 and the upper wall of the branch frame body 31, and is integrally secured to the intersection portion 2R by inserting the bolt B into the bolt hole h formed in each member and securing the bolt B to the nut 23a of the first bulkhead 23.

As illustrated in FIGS. 5 to 7, the main frame bolt connection portion 44 is connected only to the front side frame 2 at a position spaced apart forwardly from the intersection portion 2R. More specifically, as illustrated in FIG. 7B, the main frame bolt connection portion 44 is disposed on the upper wall of the side frame body 21, and is fixed to the front side frame 2 by inserting the bolt B into the bolt hole h formed in each member and securing the bolt B to the nut 24a of the second bulkhead 24.

As illustrated in FIGS. 5 to 7, the branch frame bolt connection portion 45 is connected only to the branch frame 3 at a position obliquely spaced apart forwardly from the intersection portion 2R. More specifically, as illustrated in FIG. 7C, the branch frame bolt connection portion 45 is disposed on the upper wall of the branch frame body 31, and is fixed to the branch frame 3 by inserting the bolt B into the bolt hole h formed in each member and securing the bolt B to the nut 32a of the second wall 32.

In this manner, the engine mounting member 4R is integrally connected by the three bolt connection portions 43, 44, 45 arranged in a triangle shape in a plan view at the intersection portion 2R of the front side frame 2 and the branch frame 3. Consequently, the engine mounting member 4R serves as the reinforcing member 6, and prevents the branch frame 3 from being disconnected from the front side frame 2 when a narrow offset collision occurs.

Figure 8:
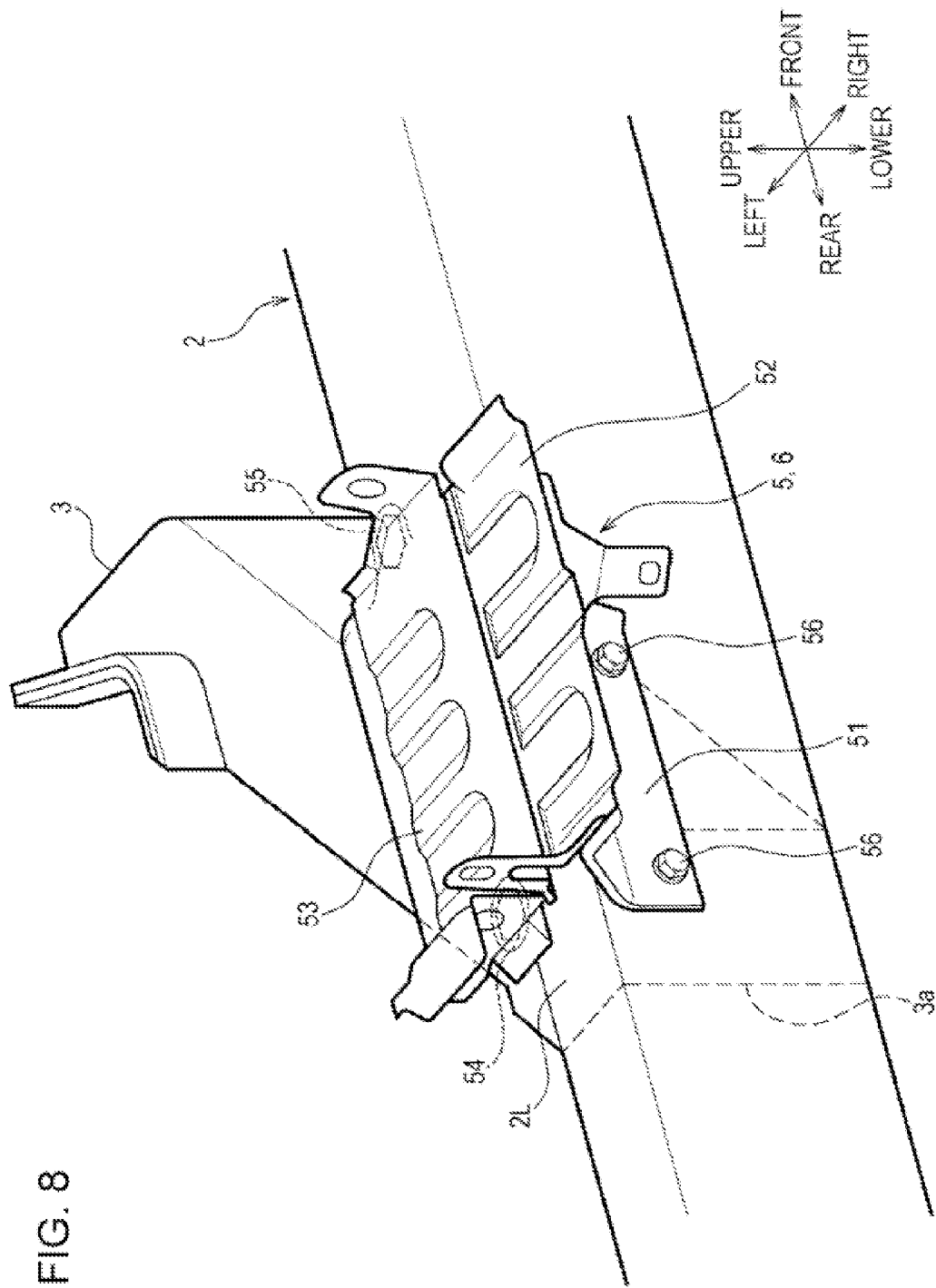
FIG. 8 is a perspective view of a battery base installed at the left-side intersection portion.
Figure 9:
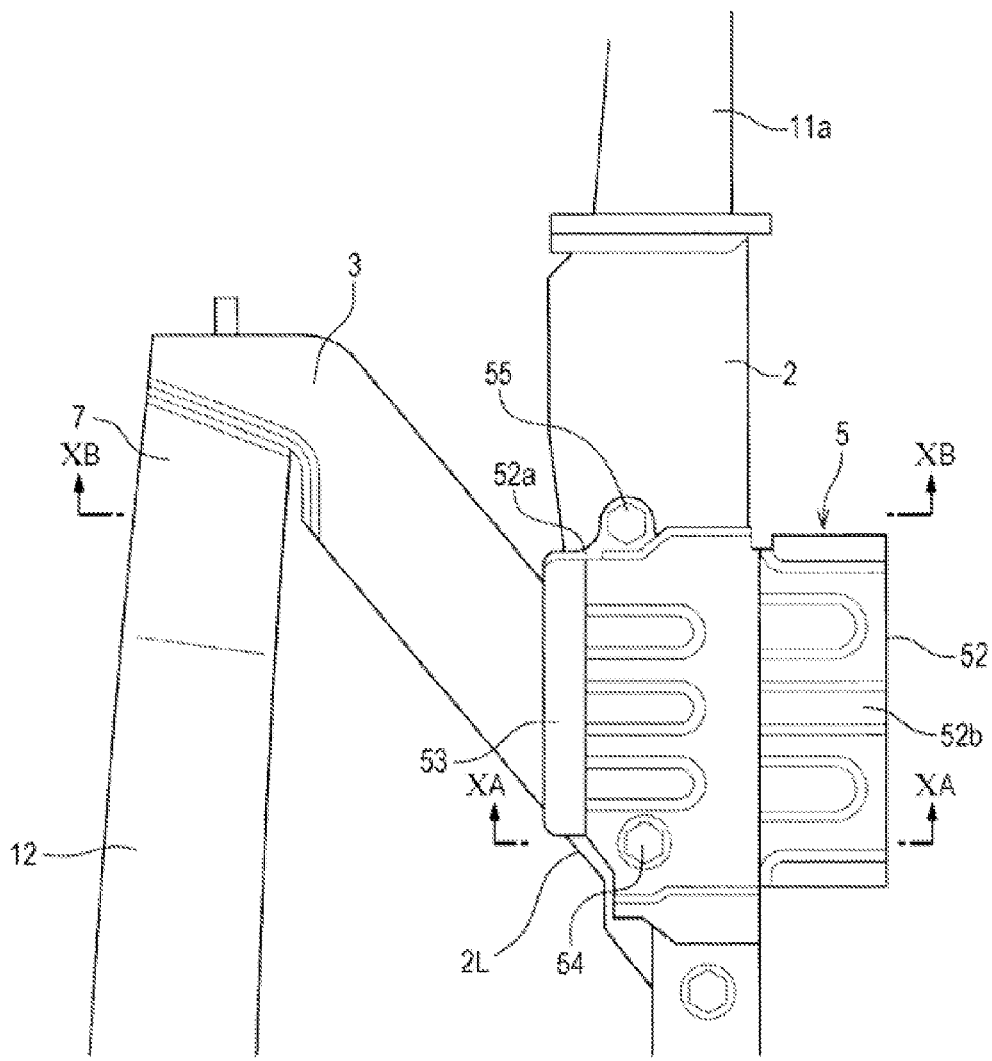
FIG. 9 is a plan view of the left-side intersection portion and the battery base.
Figure 10A:
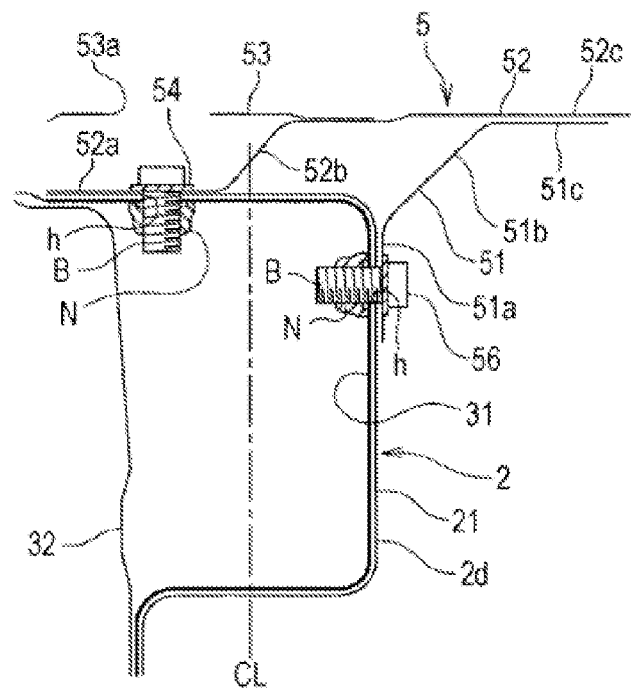
FIGS. 10A and 10B are cross-sectional views of a bolt connection portion of the battery base.
Figure 10B:
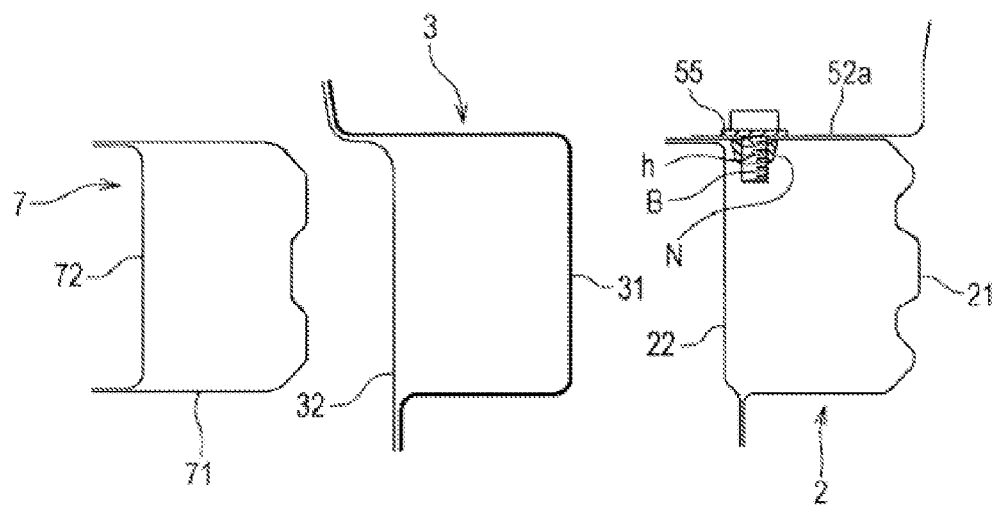

Next, the battery base 5 as the reinforcing member 6 will be described with reference to FIGS. 8 to 10B. FIG. 8 is a perspective view of a battery base installed at the left-side intersection portion. FIG. 9 is a plan view of the left-side intersection portion and the battery base. FIGS. 10A and 10B are cross-section views of a bolt connection portion of the battery base. FIG. 10A is a cross-sectional view taken along a line XA-XA in FIG. 9; and FIG. 10B is a cross-sectional view taken along a line XB-XB in FIG. 9.

As illustrated in FIGS. 8 to 10B, the battery base 5 is the base for supporting the battery BT, and is installed on the upper surface of left-side intersection portion 2L. The battery base 5 includes a first member 51, a second member 52, and a third member 53, and the above three steel members are welded and fixed to each other. In addition, the battery base 5 has a intersection portion bolt connection portion 54, a main frame bolt connection portion 55, and a side bolt connection portion 56.

As illustrated in FIG. 10A, the first member 51 is a plate member which is bent to form a trapezoidal cross-sectional channel-like shape, and serves as one leg of the battery base 5. The first member 51 has a contact portion 51a which is in contact with an inner side wall 2d of the front side frame 2, an inclined portion 51b which extends obliquely upward and inward with respect to the vehicle from the upper edge of the contact portion 51a, and a supporting portion 51c which extends substantially horizontally inward with respect to the vehicle from the upper edge of the inclined portion 51b, and supports the second member 52.

The second member 52 is a plate member which is bent to form a substantially crank-shaped cross-section, and serves as the other leg of the battery base 5 and part of supporting surface for the battery BT. The second member 52 has a contact portion 52a which is in contact with the upper surface of the front side frame 2, an inclined portion 52b which extends obliquely upward and inward with respect to the vehicle from the edge of the contact portion 52a, and a horizontal portion 52c which extends horizontally inward with respect to the vehicle from the edge of the inclined portion 52b. The supporting portion 51c of the first member 51 is welded and fixed to the lower surface of the horizontal portion 52c.

The third member 53 is a plate member which is formed in a flat plate shape, and serves as part of the supporting surface for the battery BT. The third member 53 extends over the contact portion 52a of the second member 52, and the inner edge of the third member 53 is welded and fixed to the outer edge of the horizontal portion 52c of the second member 52. The third member 53 has a through hole 53a (see FIG. 10A) at a position corresponding to the intersection portion bolt connection portion 54. The third member 53 is not disposed above the main frame bolt connection portion 55 (see FIGS. 9 and 10B).

The intersection portion bolt connection portion 54 is disposed at the rear end of the contact portion 52a, and is connected to the intersection portion 2L of the front side frame 2 and the branch frame 3. More specifically, as illustrated in FIG. 10A, the intersection portion bolt connection portion 54 is disposed at a superimposed portion of the upper wall of the side frame body 21 and the upper wall of the branch frame body 31, and is integrally secured to the intersection portion 2L by inserting the bolt B into the bolt hole h formed in each member and securing the bolt B to a nut N disposed on the rear surface of the upper wall of the branch frame body 31.

The main frame bolt connection portion 55 is disposed at the front end of the contact portion 52a, and is connected only to the upper surface of the front side frame 2 spaced apart forwardly from the intersection portion 2L. More specifically, as illustrated in FIG. 10B, the main frame bolt connection portion 55 is disposed on the upper wall of the side frame body 21, and is fixed to the front side frame 2 by inserting the bolt B into the bolt hole h formed in each member and securing the bolt B to a nut N disposed on the rear surface of the upper wall of the side frame body 21.

The side bolt connection portions 56 are disposed at the front end and the rear end of the contact portion 51a, respectively. The side bolt connection portion 56 at the rear end is connected to the inner side walls of the intersection portion 2L of the front side frame 2 and the branch frame 3. More specifically, as illustrated in FIG. 10A, the side bolt connection portion 56 is disposed at a superimposed portion of the side wall of the side frame body 21 and the side wall of the branch frame body 31, and is integrally secured to the intersection portion 2L by inserting the bolt B into the bolt hole h formed in each member and securing the bolt B to a nut N disposed at the rear surface of the side wall of the branch frame body 31. Another side bolt connection portion 56 is connected only to the inner side wall 2d of the front side frame 2 at a position spaced apart forwardly from the intersection portion 2L (see FIG. 8).

In the present embodiment, the bolt B is secured to the nut N disposed on the rear surface of the upper wall of the front side frame 2 or the branch frame 3 at the intersection portion bolt connection portion 54 and the main frame bolt connection portion 55 of the battery base 5. However, similarly to the right-side intersection portion 2R, a configuration may be adopted in which a bulkhead with a nut (not illustrated) is disposed inside the left-side front side frame 2, and a bolt is secured to the nut of the bulkhead.

As illustrated in FIG. 10A, the intersection portion bolt connection portion 54 is spaced apart outwardly with respect to the vehicle from the inner side wall 2d of the front side frame 2 (more specifically, the connecting portion between the side wall of the side frame body 21 and the side wall of the branch frame body 31). In other words, the intersection portion bolt connection portion 54 is disposed on the outer side of a center line CL of the front side frame 2 at the intersection portion 2L in the vehicle width direction. Thus, cross sectional stiffness of the intersection portion 2L of the front side frame 2 and the branch frame 3 can be increased, and the front side frame 2 and the branch frame 3 can be bent upon a narrow offset collision while generating a reaction force (load) without the branch frame 3 being disconnected.

Next, box members 7 which are interposed as an impact absorbing member between ends 3c of the branch frames 3 and the lower members 12 will be described with reference to FIG. 11. FIG. 11 is a perspective view of the vicinity of the end of the right-side branch frame. Because the box members 7 have a symmetrical structure, only the right-side box member 7 will be described, and description of the left-side box member 7 is omitted.

The box member 7 is a steel member which absorbs an impact by being crushed when a collision occurs, and is formed to extend forwardly from the end of the lower member 12. As illustrated in FIG. 11, the box member 7 is formed in a rectangular tubular shape (box shape) by combining a channel-like member 71 disposed inwardly of the vehicle and a plate-shaped member 72 disposed outwardly of the vehicle (see FIG. 10B). The end of the box member 7 is connected to the end 3c of the branch frame 3. The end 3c of the branch frame 3 is formed in a channel shape which is open rearward, and is fitted to the end of the box member 7.

The vehicle body front structure 10 according to first embodiment is basically formed in the above manner. Next, the operation of the vehicle body front structure 10 when a narrow offset collision occurs will be described with reference to FIGS. 12A, 12B and 12C. FIGS. 12A, 12B and 12C are schematic views illustrating the movement of the branch frame when a narrow offset collision occurs. FIG. 12A is a schematic view before the collision; FIG. 12B is a schematic view at an initial stage of the collision; and FIG. 12C is a schematic view at a later stage of the collision. In the following, a case will be described where the right-side of the vehicle C collides with an object X with a narrow offset.

As illustrated in FIG. 12A, the engine mounting member 4R as the reinforcing member 6 is integrally connected to the intersection portion 2R of the front side frame 2 and the branch frame 3 before the collision. The three bolt connection portions 43, 44, 45 of the engine mounting member 4R form three vertices of a predetermined triangle shape in a plan view. A portion near the end 3c of the branch frame 3 and outward of the bumper beam 11 of the thus formed vehicle body front structure 10 collides with an object X such as a utility pole, for example.

As illustrated in FIG. 12B, when a portion near the end 3c of the branch frame 3 collides with the object X, a load F is applied backward to the end 3c of the branch frame 3, and a bending moment M is generated at the base end (intersection portion 2R) of the branch frame 3 for causing the branch frame 3 to bend backward. The branch frame 3 is rotated around the intersection portion 2R due to the bending moment M, so that the end 3c is moved backward. In the above process, the engine mounting member 4R as the reinforcing member 6 is integrally connected to the intersection portion 2R, and thus the branch frame 3 is prevented from being disconnected from the front side frame 2. Therefore, along with the rotation of the branch frame 3, the front side frame 2 starts to be bent near the intersection portion 2R so as to project toward the driving force mount chamber MR. Due to backward movement of the end 3c of the branch frame 3, the box member 7 started to be crushed which is interposed between the front wheel (not illustrated) disposed under the lower member 12 and the end 3c of the branch frame 3.

When the collision process further proceeds as illustrated in FIG. 12C, the branch frame 3 is further rotated around the intersection portion 2R, so that the end 3c is moved backward, and accordingly, the front side frame 2 is significantly bent so as to project inwardly with respect to the vehicle. The load F in a narrow offset collision is absorbed by the bending of the front side frame 2. In addition, further backward movement of the end 3c of the branch frame 3 causes the box member 7 to be crushed significantly. The load F in the narrow offset collision is absorbed by the crushing of the box member 7.

As described above, with the vehicle body front structure 10 according to the first embodiment, the reinforcing member 6 is integrally connected to the intersection portions 2R, 2L of the front side frame 2 and the branch frame 3, and thus, for example when a narrow offset collision occurs, the branch frame 3, the front side frame 2, and the reinforcing member 6 are moved together (as a unit). Consequently, the front side frame 2 and the branch frame 3 can be bent while generating a reaction force (load) without the branch frame 3 being disconnected from the front side frame 2, and thus the energy of the narrow offset collision can be absorbed.

Furthermore, the engine mounting member 4R and the battery base 5, which are supporting members for supporting the devices installed in the driving force mount chamber MR, are integrally connected to the intersection portions 2R, 2L of the front side frame 2 and the branch frame 3 as the reinforcing members 6, respectively. Thus, an additional reinforcing member is not necessary, and an increase in the number of components can be reduced. Furthermore, complicated manufacturing process can be prevented, and an increase in the weight of the vehicle can be reduced.

In addition, the reinforcing member 6 on the right side of the vehicle is formed by the engine mounting member 4R, and thus the engine mounting member 4R and the reinforcing member 6 can be fastened simultaneously, and therefore, an increase in the number of components and manufacturing steps can be reduced. Furthermore, the engine mounting member 4R includes the intersection portion bolt connection portion 43 connected to the intersection portion 2R of the front side frame 2 and the branch frame 3; the main frame bolt connection portion 44 connected only to the front side frame 2; and the branch frame bolt connection portion 45 connected to the branch frame 3, and the three bolt connection portions 43, 44, 45 are arranged so as to form three vertices of a triangle shape. Therefore, the securing position of the engine mounting member 4R can be optimally arranged, and a vibration control effect can be increased by stably supporting the engine mounting member 4R. In addition, the front side frame 2 and the branch frame 3 can be connected firmly because the metal base used for securing the engine mounting member 4R has high strength, and thus disconnection of the branch frame 3 from the front side frame 2 can be reliably prevented.

Because the reinforcing member 6 on the left-side of the vehicle is formed by the battery base 5, the battery base 5 and the reinforcing member 6 can be fastened simultaneously, and therefore, an increase in the number of components and manufacturing steps can be reduced. In addition, the battery base 5 includes the intersection portion bolt connection portion 54 connected to the front side frame 2 and the branch frame 3, and the main frame bolt connection portion 55 connected only to the front side frame 2, and thus disconnection of the branch frame 3 from the front side frame 2 can be reliably prevented by reinforcing the intersection portion 2L of the front side frame 2 and the branch frame 3.

Because the intersection portion bolt connection portion 54 is spaced apart from the connecting portion between the inner surface of the inner side wall 2d of the front side frame 2 and the branch frame 3, cross sectional stiffness of the intersection portion 2L of the front side frame 2 and the branch frame 3 can be increased, and the front side frame 2 and the branch frame 3 can be bent upon a narrow offset collision while generating a reaction force (load) without the branch frame 3 being disconnected.

The intersection portion bolt connection portion 43 and the main frame bolt connection portion 44 are secured via bolts to the nuts 23a, 24a which are fixed to the first bulkhead 23 and the second bulkhead 24 in the front side frame 2, and thus strength of the connection between the engine mounting member 4R as the reinforcing member, and the front side frame 2 and the branch frame 3 can be improved, and the front side frame 2 and the branch frame 3 can be bent while generating a reaction force (load) without the branch frame 3 being disconnected from the front side frame 2.

The vehicle body front structure 10 further includes the pair of left and right lower members 12 which extend in the longitudinal direction, and are located on the outer side of the front side frame 2, and the end 3c of the branch frame 3 is connected to the box-shaped box member 7 which extends forwardly from the end of the lower member 12, and thus when the branch frame 3 is pushed backward and deformed in a narrow offset collision, the box member 7 is crushed between an object X and the front wheel, and the energy of the collision can be absorbed.

Figure 14:
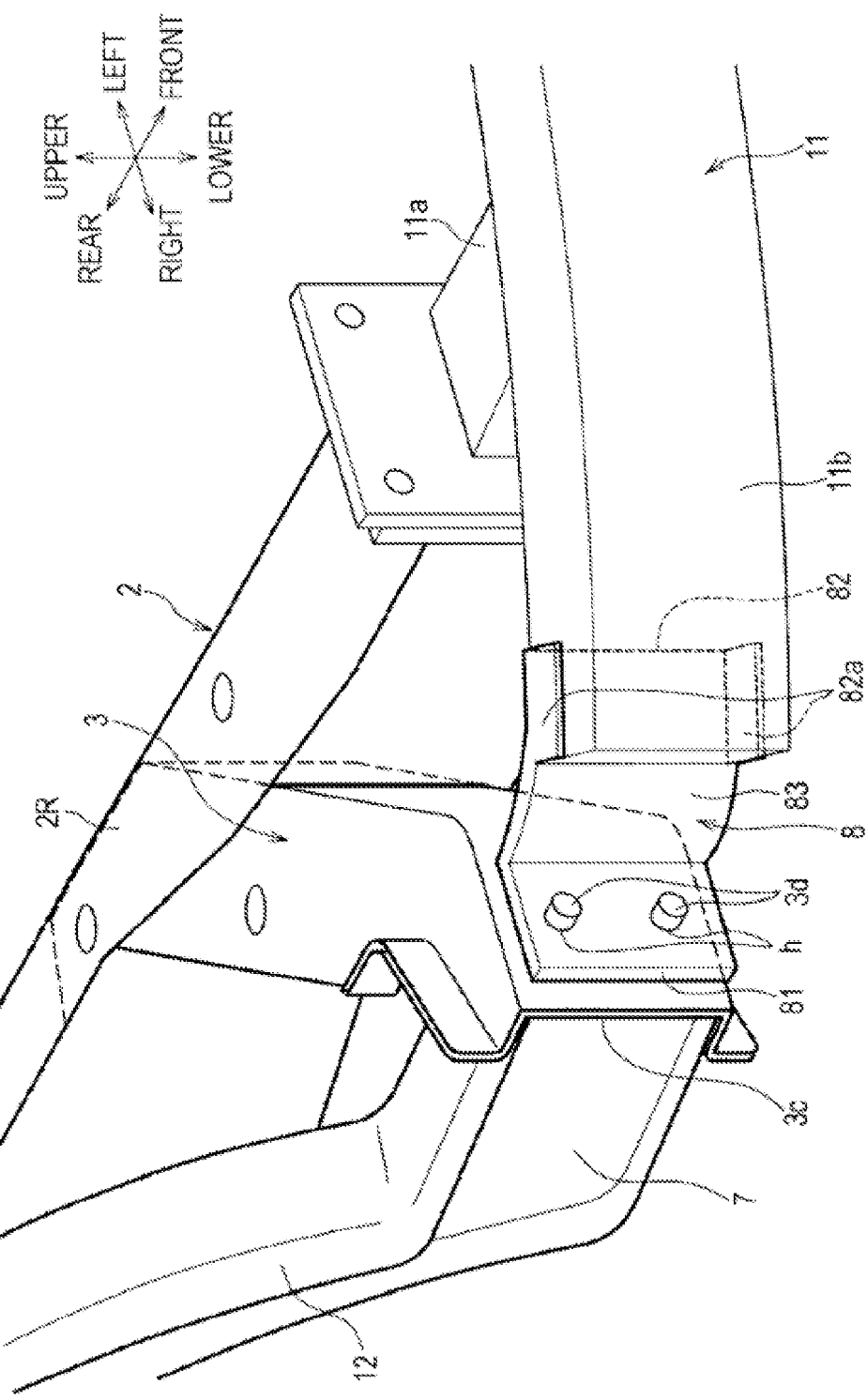
FIG. 14 is a perspective view of the vicinity of the end of a right-side branch frame according to the second embodiment.

Next, a vehicle body front structure 10A according to a second embodiment will be described with reference to FIGS. 13 and 14. The vehicle body front structure 10A according to the second embodiment differs from the vehicle body front structure 10 according to the first embodiment in that both ends of the bumper beam 11 are connected to the respective ends 3c of the branch frames 3 via connecting members 8. In the following, points of difference from first embodiment will be mainly described, and the same components as in the first embodiment are labeled with the same reference symbols and redundant description is omitted.

The bumper beam 11 has extending portions 11b on both ends, which extend outwardly of the vehicle with respect to the extensions 11a. The extending portion 11b is bent rearward such that the distance between the extending portion 11b and the end 3c of the branch frame 3 decreases from the inner side toward the outer side along the vehicle width direction.

The connecting members 8 are members which connect the ends 3c of the branch frames 3 and the respective extending portions 11b of the bumper beam 11, and each connecting member 8 is a plate member which is bent and formed in a predetermined shape by a method such as press molding. The connecting member 8 includes a first mounting portion 81 to be mounted to the end 3c of the branch frame 3, a second mounting portion 82 to be mounted to the extending portion 11b, and a connecting portion 83 which connects the first mounting portion 81 to the second mounting portion 82. Because the connecting members 8 have a symmetrical structure, the right-side connecting member 8 will be described in the following, and description of the left-side connecting member 8 is omitted.

The first mounting portion 81 is a flat plate-shaped portion, and has two bolt holes h. Two bolts 3d, which are implanted to the end 3c of the branch frame 3, are inserted in the respective bolt holes h. The first mounting portion 81 is fixed to the end 3c of the branch frame 3 by securing nuts (not illustrated) to the bolts 3d which are inserted in the respective bolt holes h.

Flanges 82a protrude from the upper and lower edges of the second mounting portion 82 to form a U-shaped cross-section. The second mounting portion 82 is fixed to the extending portion 11b of the bumper beam 11 so as to be fitted thereto from the rear surface thereof.

The connecting portion 83 is a portion which connects the first mounting portion 81 to the second mounting portion 82, and is curved in an arc-shape projecting forward in a plan view.

Thus, in the vehicle body front structure 10A according to the second embodiment, the end 3c of the branch frame 3 is connected to the extending portion 11b of the bumper beam 11 via the connecting member 8, and thus in a light collision, the bumper beam 11 and the connecting member 8 are deformed to absorb the impact of the collision, and deformation of the vehicle body frame such as the branch frame 3, the lower member 12, or the front side frame 2 can be prevented. Therefore, repair cost is reduced, and the bumper beam 11 and the connecting member 8 are deformed to absorb the impact.

So far, the vehicle body front structures 10, 10A according to the present embodiments have been described in detail with reference to the drawings, however, it is needless to say that the present disclosure is not limited to those embodiments, and may be changed as needed without departing from the spirit of the present disclosure.

For example, the engine mounting member 4R and the battery base 5 are used as the reinforcing members 6 in the present embodiment, however the present disclosure is not limited to this, and a supporting member for a device installed in the driving force mount chamber MR may be utilized as the reinforcing member 6. Alternatively, the engine mounting members 4R, 4L may be installed at the intersection portions 2R, 2L as the reinforcing members 6 on both left and right sides.

A reinforcing member 6 may be newly installed at the intersection portion 2R, 2L rather than a supporting member for a device installed in the driving force mount chamber MR. In this case, the operational effect of reducing an increase in the number of components is lower, however, the branch frame 3 can be prevented from being disconnected by reinforcing the intersection portions 2R, 2L of the branch frame 3 and the front side frame 2.

Although the end 3c of the branch frame 3 is connected to the lower member 12 via the box member 7 in the present embodiment, the present disclosure is not limited to this, and a configuration may be adopted in which the end 3c of the branch frame 3 may be connected to the end of the front side frame 2 via a connecting member (not illustrated). With the above configuration, disconnection of the branch frame 3 when a narrow offset collision occurs can be further prevented.

In the present embodiment, the battery base 5 is provided with the intersection portion bolt connection portion 54 and the main frame bolt connection portion 55, however, similarly to the engine mounting member 4R, a configuration may be adopted in which the battery base 5 is further provided with a branch frame bolt connection portion which is connected to the branch frame 3 only. In this manner, the bolt connection portions of the battery base 5 are arranged in a triangle shape in a plan view, and thus the stiffness of left-side intersection portion 2L can be further improved and disconnection of the branch frame 3 can be reliably prevented.

I claim:

1. A vehicle body front structure comprising:
a front side frame installed at a front of a vehicle body, and extending in a longitudinal direction of the vehicle body;
a power unit disposed in a driving force transmission chamber positioned on an inner side of the front side frame in a vehicle width direction;
a branch frame branching from the front side frame to extend obliquely forward and outward in the vehicle width direction,
wherein a rear end of the branch frame penetrates through an outer side wall of the front side frame to an inside thereof, and extends along an inner surface of the front side frame; and
a reinforcing member integrally connected to an intersection portion of the branch frame and the front side frame.

2. The vehicle body front structure according to claim 1, wherein the reinforcing member is a supporting member which supports a device disposed in the driving force transmission chamber.

3. The vehicle body front structure according to claim 1, wherein the reinforcing member is an engine mounting member, and the engine mounting member includes an intersection portion bolt connection portion connected to the intersection portion of the front side frame and the branch frame; a main frame bolt connection portion connected to the front side frame; and a branch frame bolt connection portion connected to the branch frame, and the three bolt connection portions form three vertices of a triangle shape.

4. The vehicle body front structure according to claim 1, wherein the reinforcing member is a battery base, and the battery base includes an intersection portion bolt connection portion connected to the front side frame and the branch frame; and a main frame bolt connection portion connected to the front side frame.

5. The vehicle body front structure according to claim 3, wherein the front side frame includes an inner side wall opposite to the outer side wall,
wherein the branch frame contacts an inner surface of the inner side wall of the front side frame, and
wherein the intersection portion bolt connection portion is spaced apart, in the vehicle width direction, from the contact portion between the branch frame and the inner surface of the inner side wall of the front side frame.

6. The vehicle body front structure according to claim 3, wherein the front side frame includes a first bulkhead and a second bulkhead therein, and
the main frame bolt connection portion and the intersection portion bolt connection portion are secured to the first bulkhead and the second bulkhead, respectively by respective bolts.

7. The vehicle body front structure according to claim 1, further comprising
a lower member disposed at an outer position with respect to the front side frame in the vehicle width direction and extending in the longitudinal direction,
wherein the lower member includes a box-shaped impact absorbing member extending forwardly from a front end thereof, and
wherein a front end of the branch frame is connected to the box-shaped impact absorbing member.

8. The vehicle body front structure according to claim 1, further comprising
a bumper beam installed at a front end of the front side frame,
wherein the branch frame is connected to an end of the bumper beam in the vehicle width direction by a connecting member.

9. The vehicle body front structure according to claim 7, further comprising
a bumper beam installed at a front end of the front side frame, wherein the branch frame is connected to an end of the bumper beam in the vehicle width direction by a connecting member.

10. The vehicle body front structure according to claim 1, wherein the intersection portion is located at a position corresponding to the power unit in a side view of the vehicle body.

11. A vehicle body front structure comprising:

a pair of left and right front side frames which are installed at a front of a vehicle body, and extend in a longitudinal direction of the vehicle body; and a power unit disposed in a driving force transmission chamber between the left and right front side frames, wherein each of the left and right front side frames include:

a branch frame branching from the front side frame to extend obliquely forward and outward in a vehicle width direction, wherein a rear end of the branch frame penetrates through an outer side wall of the front side frame to an inside thereof, and extends along an inner surface of the front side frame; and a reinforcing member integrally connected to an intersection portion of the branch frame and the front side frame.

\* \* \* \* \*